United States Patent Office 3,097,249
Patented July 9, 1963

3,097,249
PROCESS FOR SEPARATING HYDROCARBON MIXTURES
Alan Marchant and Michael David Wynne, Norton-on-Tees, England, assignors to Imperial Chemical Industries Limited, London, England, a corporation of Great Britain
No Drawing. Filed June 12, 1961, Ser. No. 116,275
Claims priority, application Great Britain June 13, 1960
11 Claims. (Cl. 260—681.5)

This invention relates to the separation of hydrocarbon mixtures comprising cyclic and acyclic conjugated dienes. More particularly the invention relates to the separation of mixtures of 1:3-cyclopentadiene and conjugated acyclic pentadienes.

Lower cyclic and acyclic conjugated dienes occur for example in light naphtha pyrolysis products, from which they may be concentrated as a mixture, usually containing lower mono-olefines, by usual methods such as distillation. The isolation of the cyclic and acyclic conjugated dienes from these mixtures by such methods is however beset by difficulties, due not only to the relatively narrow boiling range of the mixtures but also to their ready interaction. Thus such mixtures may be readily treated to dimerise the cyclic components which are then appreciably less volatile, but under normal dimerisation conditions interaction between the cyclic and acyclic components occurs which greatly complicates their separation in good yields.

We have now found that this interaction is considerably diminished, thereby facilitating separation of the said components, when the dimerisation is conducted in the presence of sulphur dioxide under conditions in which sulphone formation of each acyclic component takes place. The sulphone may then be decomposed and the recovered acyclic compound distilled from the dimerised cyclic component.

Accordingly the present invention provides a process for the separation of cyclic and acyclic conjugated diene components of a mixture which comprises treating the mixture with sulphur dioxide under conditions in which the cyclic and acyclic components are respectively dimerised and converted to sulphone, decomposing the sulphone thus formed and distilling from the dimer a volatile fraction containing the acyclic component thus liberated.

The residual dimer may be purified for example by distillation and converted to monomer by known methods.

The cyclic and acyclic components of the mixture preferably have the same number of carbon atoms, homologues being substantially absent or previously removed. More preferably, the mixture comprises a concentrate of 1:3-cyclopentadiene and one or more acyclic conjugated pentadienes, particularly isoprene and piperylene, which is obtained by distilling cracked light naphtha product.

The mixture of cyclic and acyclic conjugated dienes may be treated in any convenient manner with the sulphur dioxide, which may be liquid or gaseous. The sulphur dioxide and the hydrocarbons may be agitated together. Preferably the mixture is treated at moderately elevated temperature and pressure, particularly between the limits of 40–150° C. and 20–1000 p.s.i.g. with a substantial excess of liquid sulphur dioxide over the stoichiometric amount for converting each acyclic component to its sulphone. The time during which the mixture is in contact with the liquid sulphur dioxide should be sufficient to effect substantially complete reaction, and is preferably within the range ¼–8 hours.

It is preferable, before decomposing the sulphone in the treated mixture, to strip off excess sulphur dioxide and any remaining volatile hydrocarbons. This stripping operation may be conveniently effected by reducing the pressure to atmospheric or lower pressure while maintaining the treated mixture at moderately elevated temperature, for example 50° C.–100° C., which is however not sufficient to decompose the sulphones.

The decomposition stage of the process according to the present invention is preferably carried out by heating the treated mixture to a moderately elevated temperature, preferably within the range 100–150° C. and more particularly at approximately 140° C. for a few hours, for example 5 hours and at a pressure at which the liberated sulphur dioxide and acyclic component distill off. Sulphur dioxide may be removed from the liberated acyclic component for example by distilling under pressure or by dissolving it in water or an aqueous solution. The sulphur dioxide recovered from the stripping and decomposition operations may be recovered and used again.

The acyclic components, free from sulphur dioxide may be separated from one another for example by redistillation in a refrigerated fractional distillation apparatus.

The dicyclopentadiene may also be purified, for example by distillation and depolymerised by known methods.

Each of the steps comprising the present invention may be effected in a series of units suitable for the purpose, and the process is suitable for batchwise or continuous operation.

Stabilising amounts of antioxidants, such as alkylated phenols such as 4-methyl-2,6-di-tert.-butylphenol, tert.-butyl catechol or 2,4-dimethyl-6-tert.-butylphenol may be added to hydrocarbon mixtures treated according to the present invention.

*Example*

A petrol distillate obtained by deep steam pyrolysis of light naphtha was redistilled at atmospheric pressure through a 45 plate column with an overhead temperature of 34° C. The distillate consisted principally of $C_5$ hydrocarbons, and showed the following analysis:

| | Percent by weight |
|---|---|
| 1:3 cyclopentadiene | 15–17 |
| Isoprene | 10–12 |
| Piperylene | 5–8 |

1000 grams of this distillate was treated in a rocking autoclave with 820 grams of liquid sulphur dioxide for 5 hours at 80° C. and 400 p.s.i.g. After cooling, the autoclave pressure was reduced to atmospheric pressure, and the product distilled at 100 mm. Hg pressure to remove residual sulphur dioxide and volatile hydrocarbons.

The distilled product comprising cyclopentadiene dimer and the sulphones of isoprene and piperylene was charged to a distillation kettle and heated to 140° C. for 5 hours at atmospheric pressure. The overhead vapours comprising sulphur dioxide, isoprene and piperylene were collected and bubbled through a 20% aqueous sodium hydroxide solution at about atmospheric temperature and pressure to dissolve out the sulphur dioxide, and the undissolved acyclic hydrocarbons were given a further wash with water. The yield corresponded to a 90% recovery of isoprene and piperylene respectively.

The residue in the decomposition kettle was redistilled at 35 mm. Hg pressure through a plate column with an overhead temperature of 75° C. The distillate comprised cyclopentadiene dimer of more than 99% purity corresponding to 80% recovery.

We claim:
1. A process for the separation of cyclic and acyclic conjugated diene components of a mixture which comprises treating the mixture with sulphur dioxide under conditions in which the cyclic and acyclic components are respectively dimerised and converted to sulphone, de- composing the sulphone thus formed and distilling from the dimer a volatile fraction containing the acyclic component thus liberated.

2. A process according to claim 1 in which the mixture is treated with a substantial excess of liquid sulphur dioxide at moderately elevated temperature and pressure.

3. A process according to claim 2 in which the said temperature and pressure are between 40–150° C. and 20–1000 p.s.i.g.

4. A process according to claim 1 in which before decomposing the sulphone, excess sulphur dioxide and volatile hydrocarbons are stripped from the treated mixture.

5. A process according to claim 4 in which the said stripping is carried out by decreasing the pressure of the treated mixture at a moderately elevated temperature.

6. A process according to claim 5 in which stripping is carried out at atmospheric or lower pressure and at 60–100° C.

7. A process according to claim 1 in which the sulphone is decomposed by heating the treated mixture between 100 and 150° C. at a pressure at which the liberated sulphur dioxide and acyclic components distill off.

8. A process according to claim 1 in which sulphur dioxide in the volatile fraction is removed from the acyclic component by dissolving in water or an aqueous solution.

9. A process according to claim 1 in which the mixture comprises a distillation concentrate of a petrol fraction from steam-cracked naphtha.

10. A process according to claim 1 in which the acyclic component is selected from piperylene and isoprene and the cyclic component is selected from cyclopentadiene and methyl cyclopentadiene.

11. A process according to claim 1 in which the mixture contains a stabilising amount of an antioxidant selected from the group consisting of 4-methyl-2,6-di-tert.-butylphenol, tert.-butylcatechol and 2,4-dimethyl-6-tert.-butylphenol.

References Cited in the file of this patent
UNITED STATES PATENTS

Re. 22,671    Morris et al. _____ Aug. 28, 1945
2,403,054    Craig _____ July 2, 1946